United States Patent
West et al.

(10) Patent No.: US 12,437,585 B2
(45) Date of Patent: Oct. 7, 2025

(54) TIRE SENSOR MONITORING

(71) Applicant: The Goodyear Tire & Rubber Company, Akron, OH (US)

(72) Inventors: Jeffrey McKay West, North Canton, OH (US); Peter Jung-min Suh, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 176 days.

(21) Appl. No.: 18/466,259

(22) Filed: Sep. 13, 2023

(65) Prior Publication Data
US 2024/0177530 A1 May 30, 2024

Related U.S. Application Data

(60) Provisional application No. 63/385,281, filed on Nov. 29, 2022.

(51) Int. Cl.
| | | |
|---|---|---|
| G07C 5/00 | (2006.01) | |
| B60C 23/04 | (2006.01) | |
| G05D 1/00 | (2006.01) | |
| G07C 5/08 | (2006.01) | |

(52) U.S. Cl.
CPC .......... *G07C 5/008* (2013.01); *B60C 23/0479* (2013.01); *G05D 1/0214* (2013.01); *G07C 5/0808* (2013.01); *G07C 5/085* (2013.01)

(58) Field of Classification Search
CPC ...... G07C 5/008; G07C 5/0808; G07C 5/085; B60C 23/0479; G05D 1/0214
See application file for complete search history.

(56) References Cited

U.S. PATENT DOCUMENTS

| | | |
|---|---|---|
| 6,408,690 B1 | 6/2002 | Young |
| 6,937,144 B2 | 8/2005 | Drake et al. |
| 7,509,849 B2 | 3/2009 | Rutherford et al. |
| 7,944,346 B2 | 5/2011 | De Castro et al. |
| 9,079,461 B2 | 7/2015 | Suh et al. |
| 10,144,253 B2 | 12/2018 | Mays |
| 10,173,480 B2 | 1/2019 | Huang |
| 10,464,379 B2 | 11/2019 | Hennig |
| 10,611,198 B2 | 4/2020 | Toth |
| 10,675,926 B2 | 6/2020 | Mouchet |
| 10,809,742 B2 | 10/2020 | Fontaine et al. |

(Continued)

FOREIGN PATENT DOCUMENTS

| | | |
|---|---|---|
| EP | 3941763 A4 | 11/2022 |
| EP | 4112335 A1 | 1/2023 |

(Continued)

OTHER PUBLICATIONS

European Search Report for application No. 23212106.1 dated Feb. 29, 2024.

*Primary Examiner* — Michael V Kerrigan
(74) *Attorney, Agent, or Firm* — Edward T. Kennedy

(57) ABSTRACT

Disclosed are various embodiments for monitoring tire sensors. An intermediate data transfer apparatus can communicate with tire pressure monitoring (TPM) sensors of tires within a predefined distance of the apparatus to retrieve sensor information. The intermediate data transfer apparatus can generate sensor data records including the retrieved sensor information can be generated and stored on a remote computing device.

19 Claims, 5 Drawing Sheets

(56) References Cited

U.S. PATENT DOCUMENTS

| | | |
|---|---|---|
| 10,935,466 B2 | 3/2021 | Lin |
| 11,872,851 B2 | 1/2024 | Kona |
| 2003/0006895 A1* | 1/2003 | Drake ................ B60C 23/0479 340/933 |
| 2007/0018805 A1 | 1/2007 | Dixon et al. |
| 2008/0042817 A1 | 2/2008 | Fogelstrom |
| 2009/0307031 A1 | 12/2009 | Winkler et al. |
| 2011/0043343 A1 | 2/2011 | Shepler et al. |
| 2012/0029759 A1 | 2/2012 | Suh et al. |
| 2017/0120700 A1 | 5/2017 | Mouchet |
| 2019/0329608 A1 | 10/2019 | Fraiss |
| 2022/0063357 A1 | 3/2022 | Singh et al. |
| 2022/0250245 A1* | 8/2022 | Panigrahi ............ G01M 17/007 |

FOREIGN PATENT DOCUMENTS

| | | |
|---|---|---|
| EP | 4140783 A1 | 3/2023 |
| WO | 2005113261 A1 | 12/2005 |

\* cited by examiner

TIRE SENSOR MONITORING

BACKGROUND

Freight hauling equipment can be used to transport freight by road, rail, ocean, and air. Freight haulers designed to travel on roads, highways, or other substantially flat surfaces can include various types of vehicles or trailers having wheels with pneumatic tires. Freight haulers used for transportation over ground by road can include semitrucks, trailers, or other equipment with wheels and suitable for travel on road.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DEFINITIONS

"TPMS" means a tire pressure monitoring system, which is an electronic system that measures the internal pressure of a tire and is capable of communicating the pressure to a processor that is mounted on the vehicle and/or is in electronic communication with electronic systems of the vehicle and/or the trailer computing device.

DETAILED DESCRIPTION

The present disclosure relates to monitoring tire sensors in accordance to various embodiments. Vehicles, including freight haulers, can be equipped with tire sensors mounted on the inside of the tire for each wheel on the vehicle to obtain information regarding physical parameters of the tire, such as, for example, tire pressure, temperature, and the like.

According to various examples of the present disclosure, the condition of tires on freight haulers can be monitored for both in-use and not-in-use trailers or other types of freight haulers. For example, a trailer that is not in use may be parked for an extended period of time. By monitoring the tire condition of the tires of the not-in-use trailer, information to address tire maintenance issues or other issues can be obtained prior to the trailer being put back in service. According to various examples of the present disclosure, a system for tire sensor monitoring can be implemented in a fleet yard where freight hauling trailers or other types of freight haulers can be stored for extended periods of time. Example implementations of the system can include an intermediate data transfer apparatus configured to obtain information from the tire sensors on respective trailers or freight haulers. In the following discussion, a general description of the system and its components is provided, followed by a discussion of the operation of the same.

Figure 1:
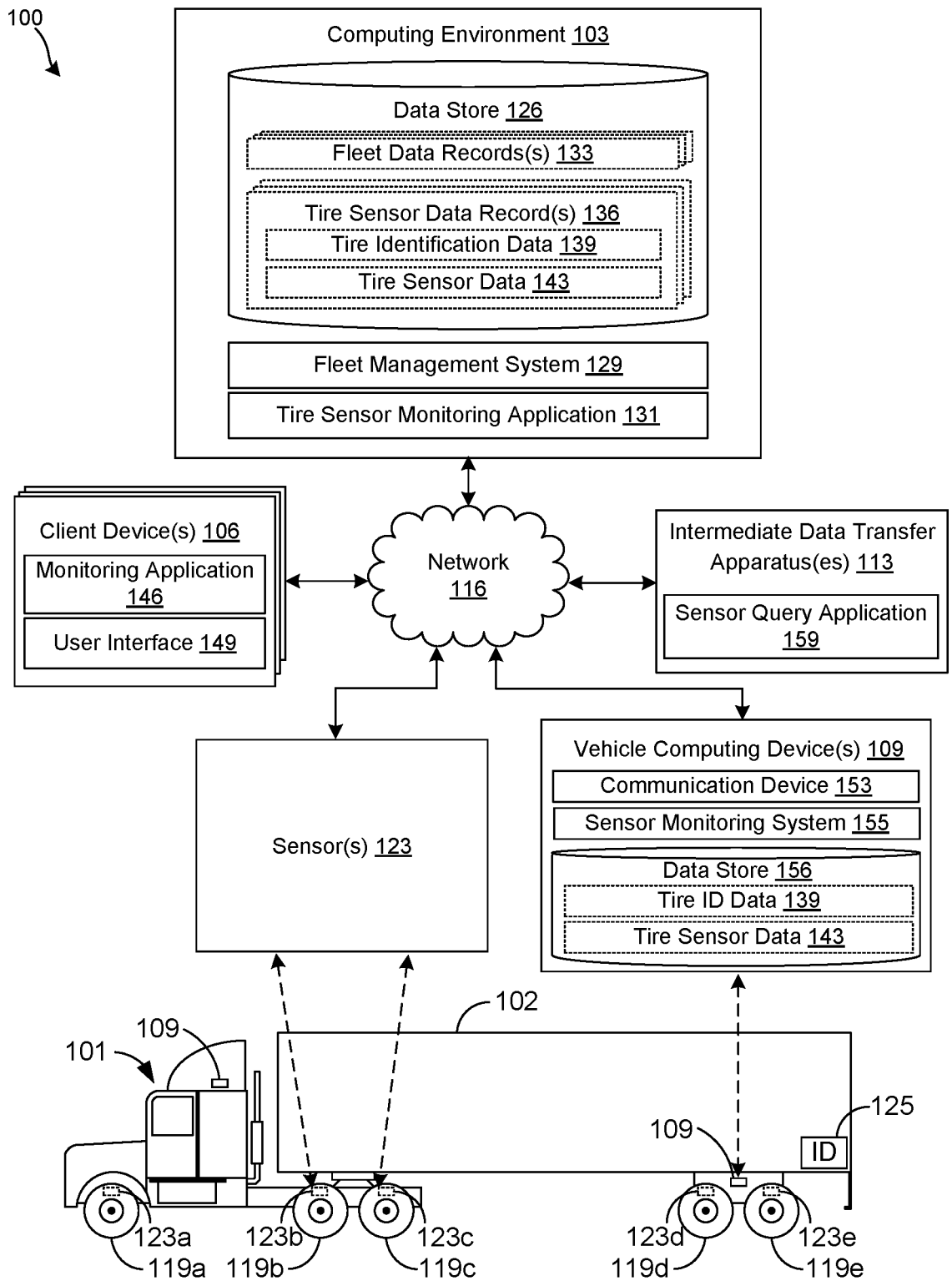
FIG. 1 is a drawing of a networked environment according to various embodiments of the present disclosure.

With reference to FIG. 1, shown is a networked environment 100 for tire sensor monitoring of freight haulers, such as a semitruck 101, trailer 102, or other vehicle according to various embodiments. The networked environment 100 includes a computing environment 103, a client device 106, one or more vehicle computing devices 109, and an intermediate data transfer apparatus 113, which are in data communication with each other via a network 116.

The network 116 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 116 can also include a combination of two or more networks 116. Examples of networks 116 can include the Internet, intranets, extranets, virtual private networks (VPNs), and similar networks.

A trailer 102 can be attached to a semitruck 101 to haul freight over ground via roadways and can have tires 119a-119e (collectively referred to as "tires 119" or generically referred to as "a tire 119") equipped with tire sensors 123a-123e (collectively referred to as "tire sensors 123" or generically referred to as "a tire sensor 123). The tires 119 can comprise pneumatic tires and/or other type of tires in which parameters can be measured. In some examples, the tire sensors 123 can be tire pressure monitoring (TPM) sensors that can have a battery inside for power, as well as a wireless transmitter, which can broadcast data of the measured parameters, such as tire pressure, temperature, etc. The tire sensors 123 can be programmed to send data on a time interval, such as every 30 seconds, 2 minutes, 5 minutes, or other predetermined time interval. The tire sensors 123 can also go into a sleep mode and be programmed to periodically activate during sleep mode to transmit sensor information, such as the temperature and pressure data. In some cases, broadcast of data can be enabled or disabled on demand via a signal or other means. While a TPM sensor is one example of a tire sensor 123, some vehicles may be equipped with other sensors to communicate other data related to the condition of the corresponding tire or vehicle.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 126 that is accessible to the computing environment 103. The data store 126 may be representative of a plurality of data stores 126 as can be appreciated. The data stored in the data store 126, for example, is associated with the operation of the various applications and/or functional entities described below.

The components executed on the computing environment 103, for example, may include a fleet management system 129, a tire sensor monitoring application 131, and other applications, services, processes, systems, engines, or functionality not discussed in detail herein.

The fleet management system 129 is executed to maintain inventory and relevant information regarding semitrucks 101 and trailers 102 in a fleet of freight haulers, among other functions. For example, each freight hauler in the fleet can have a vehicle identifier. The vehicle identifier can be visual identifier such as a number labeled on the fright hauler or a license plate, or a digital identifier, such as a radio-frequency identification (RFID) tag 125. Similarly, each tire sensor 123 for an associated tire 119 of the freight hauler can also have a unique identifier that is digitally available (not shown). The fleet management system 129 can provide an indicator of both in-use and not-in-use trailers and assigned location. For example, a trailer 102 in-use may be assigned and attached to a specific semitruck 101 to transport freight from one location to another. A trailer 102 not-in-use may be parked in a fleet yard for a short-term or extended period of time.

The tire sensor monitoring application 131 is executed to track the status of tires 119 installed on a freight hauler. The tire sensor monitoring application 131 can interface with the fleet management system 129 and/or data store 126 to access the assigned location of the freight hauler as well as the set of tires 119 associated with the freight hauler based on the identified tire sensors 123. The tire sensor monitoring application 131 can provide information such as pressure and/or temperature of the associated tire 119 based on real-time measurement data or the most recent stored measurements.

Although the tire sensor monitoring application 131 and the fleet management system 129 are illustrated as being separate applications in FIG. 1, it should be noted that at least portions of the tire sensor monitoring application 131 can be implemented as part of the fleet management system 129 and/or at least portions of the fleet management system 129 can be implemented as part of the tire sensor monitoring application 131.

The data stored in the data store 126 includes, for example, fleet data records 133, tire sensor data records 136, and potentially other data. The fleet data records 133 can represent data associated with the semitrucks 101 and/or trailers 102 of a fleet of freight haulers, such as location, assigned routes, and the like. The tire sensor data records 136 can represent data associated with specific freight haulers, including tire identification data 139, tire sensor data 143, and other suitable data. The tire identification data 139 can be a unique identifier for each tire 119 associated with the freight hauler. The tire sensor data 143 can be measured by tire sensors 123 to provide information such as pressure and/or temperature of the associated tire 119. For example, the tire identification data 139 may include a tire identifier, manufacturing information for the tire 119 (e.g., manufacture name, tire model, etc.), tire size information (e.g., rim size, width, and outer diameter, etc.), manufacturing location, manufacturing date, a treadcap code that includes or correlates to a compound identification, a mold code that includes or correlates to a tread structure identification, and/or other information. The tire identification data 139 may also include a service history or other information to identify specific features and parameters of each tire 119.

The client device 106 is representative of a plurality of client devices that may be coupled to the network 116. The client device 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 106 may include a display. The display may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 106 may be configured to execute various applications such as a monitoring application 146 and/or other applications. The monitoring application 146 may be executed in a client device 106, for example, to access network content served up by the computing environment 103 and/or other servers, thereby rendering a user interface 149 on the display. To this end, the monitoring application 146 may comprise, for example, a browser, a dedicated application, etc., and the user interface 149 may comprise a network page, an application screen, etc. In various examples, a user associated with the client device 106 can interact with the monitoring application 146 to view the status of various fleet vehicles that are managed by the fleet management system 129. In an example, the monitoring application 146 can provide information regarding the trailers 102 identified in a particular fleet yard 200, such as the status of the tires 119 on one or more of the identified trailers 102. For example, the monitoring application 146 can indicate if there is an inconsistency in the tire sensor data records 136 compared to the fleet data records, such as number and/or position of tires 119 for a trailer 102. The monitoring application 146 can also indicate whether the tire parameters (e.g., pressure, temperature, etc.) are within predetermined ranges that are acceptable for the conditions. The client device 106 may be configured to execute applications beyond the monitoring application 146 such as, for example, email applications, social networking applications, word processors, spreadsheets, and/or other applications.

The vehicle computing device 109 can comprise a processor and memory and be attached to a freight hauler. The vehicle computing device 109 can include a communication device 153, a sensor monitoring system 155, and other suitable devices to provide physical data measurements associated with the tires 119 (e.g., sensors and measurement devices). The communication device 153 can communicate with the tire sensors 123 and store the physical parameters (e.g., pressure, temperature, etc.) of the tires 119 of the freight hauler in a data store 156. In various examples, one or more vehicle computing devices 109 can be positioned on a trailer 102 at various locations on the trailer 102, such as near the trailer axles, the trailer frame, the trailer connector, and other suitable locations within a communication range of the tire sensors 123 to receive and store electronic data related to the corresponding tires 119. For example, the communication range can be within about three meters of the tire sensors 123. In some examples, the vehicle computing device 109 can be embodied as a TPMS of the semitruck 101.

It should be noted that although the functionality of the sensor monitoring system 155 is illustrated as being part of the vehicle computing device 109 and the tire sensor monitoring application 131 and the fleet management system 129 are illustrated in FIG. 1 as being part of the computing environment 103, in some embodiments, the functionality of at least a portion of these systems can be implemented within the sensors 123, as can be appreciated.

The vehicle computing device 109 comprises a processor circuit that executes, for example, a sensor monitoring system 155 and/or other applications. In one embodiment, the vehicle computing device 109 may be integrated with other systems in the freight hauler. In the case that the freight hauler comprises a semitruck 101 and a trailer 102, a vehicle computing device 109 may be located on the back of the trailer so as to be within range of wireless communication with the sensors 123 in the tires 119 of the trailer 102. The vehicle computing device 109 can also receive tire sensor data 143 transmitted from the sensors 123 on the tires 119 of the freight hauler. In various examples, the vehicle computing device 109 can include a communication device 153 to facilitate communication with the computing environment over the network 116. In this respect, the vehicle computing device 109 may include appropriate communications capabilities to link to a cellular network, Wi-Fi network, BLUETOOTH® network, microwave transmission network, radio broadcast networks, or other communication networks.

Also, various data is stored in a data store 156 that is accessible to the vehicle computing device 109. The data store 156 may be representative of a plurality of data stores 156 as can be appreciated. The data stored in the data store 156 includes, for example, fleet data records 133, tire sensor data records 136, and potentially other data. The tire identification data 139 can represent data associated with specific tires 119 on the freight hauler. The tire sensor data 143 can include tire pressure, temperature, and other suitable data.

The intermediate data transfer apparatus 113 is representative of a plurality of intermediate data transfer apparatuses 113 that may be coupled to the network 116. The intermediate data transfer apparatus 113 may comprise, for example, a processor-based system such as a computer system. The intermediate data transfer apparatus 113 may be configured to execute various applications such as a sensor query application 159 and/or other applications. The sensor query application 159 may be executed in the intermediate data transfer apparatus 113, for example, to communicate with the tire sensors 123 of tires 119 associated with at least one freight hauler, such as a trailer 102 or semitruck 101, to retrieve sensor information. The sensor query application 159 may be executed in the intermediate data transfer apparatus 113, for example, to generate sensor data records 136 comprising the retrieved sensor information, such as tire identification data 139, tire sensor data 143, and other relevant information. The sensor query application 159 may be executed in the intermediate data transfer apparatus 113, for example, to communicate the sensor data records 136 of the at least one freight hauler over the network 116 to the computing environment 103. The sensor query application 159 may be executed in the intermediate data transfer apparatus 113, for example, to access network content served up by the computing environment 103 and/or other servers. For example, the sensor query application 159 can also be used to retrieve tire sensor data 143 of one or more of the vehicle computing devices 109.

Figure 2:
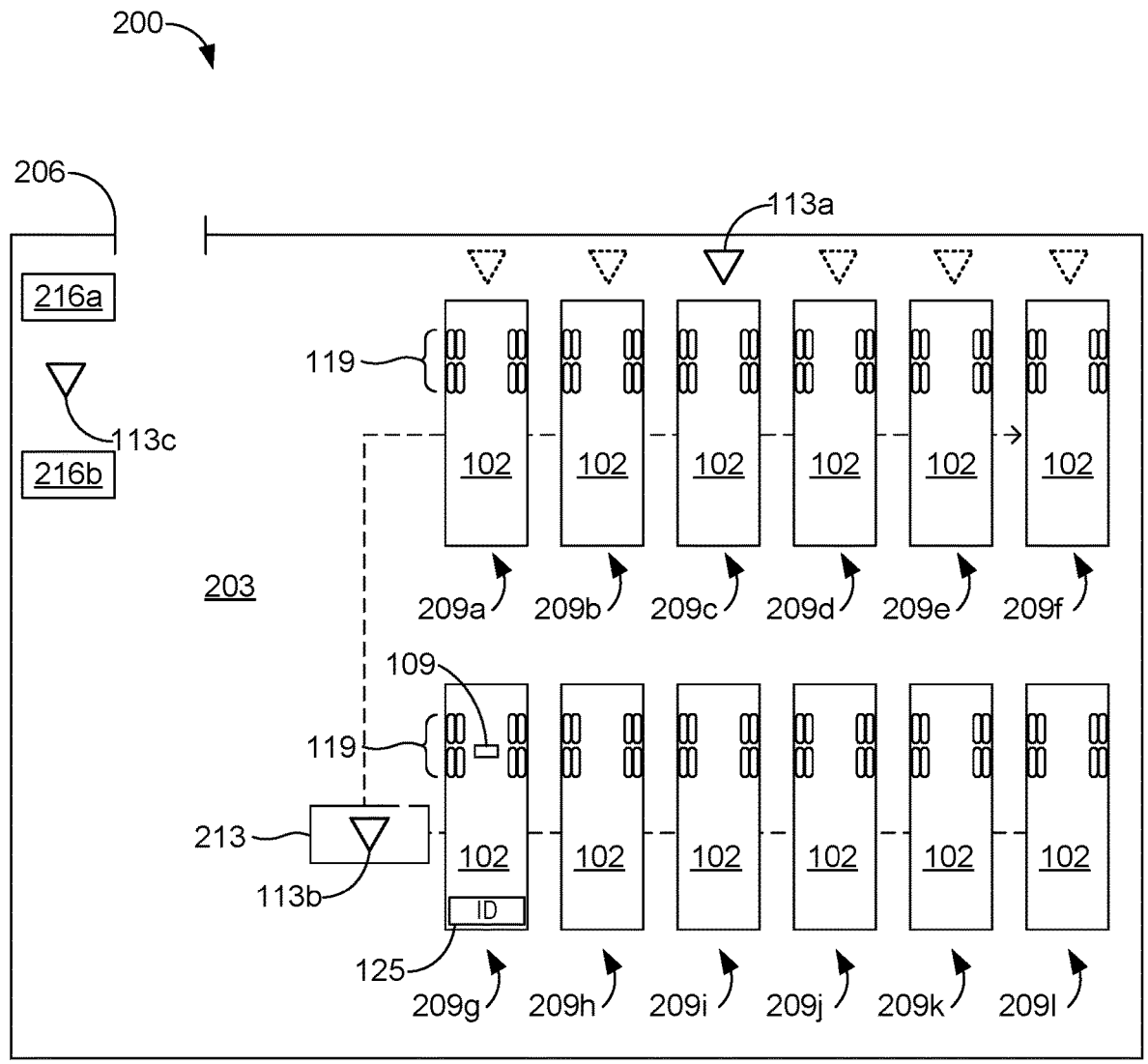
FIG. 2 is a pictorial diagram of example implementations of an intermediate data transfer apparatus of the networked environment of FIG. 1 according to various embodiments of the present disclosure.

Next, a general description of the operation of the various components of the networked environment 100 is provided with respect to FIGS. 2-5. To begin, FIG. 2 illustrates an example of a plurality of trailers 102 in a fleet yard 200. A fleet yard 200 can have a parking area 203 with a perimeter that may or may not be enclosed, for example, by a fence or wall. In some examples, a fleet yard can have an entrance 206, for access and egress for the freight haulers. While a semitruck 101 can enter the fleet yard 200 with a trailer 102 attached, the trailer 102 can be detached from the semitruck 101 and parked in a parking area 203 for short or long-term storage. For example, a parking area 203 can have one or more defined parking positions 209. In this example, the trailers 102 are shown arranged in parking positions 209a-209l (collectively referred to as "parking positions 209" or generically referred to as "a parking position 209"), although additional or fewer parking positions may be used and other arrangements of parking positions 209 can be relied upon.

In FIG. 2, the intermediate data transfer apparatus 113 is shown implemented in various ways to monitor the state of tires 119 on freight haulers, such as trailers 102. The nonlimiting example implementations of an intermediate data transfer apparatus 113a, 113b, 113c (collectively referred to as "intermediate data transfer apparatuses 113") are shown to exemplify various ways to monitor the state of the tires 119 and will be discussed in further detail. In one example, an intermediate data transfer apparatus 113 (e.g., intermediate data transfer apparatus 113a) can be positioned in one or more fixed locations relative to a parking area 203 of a trailer 102. In another example, an intermediate data transfer apparatus 113 (e.g., intermediate data transfer apparatus 113b) can be mounted on a moving platform 213 and adapted to move about the arrangement of parking positions 209. In another example, an intermediate data transfer apparatus 113 (e.g., intermediate data transfer apparatus 113c) can be positioned in a fixed location near an entrance 206 to the fleet yard 200, to obtain sensor information from the freight haulers at the time of passing within a communication range of the intermediate data transfer apparatus 113. While the examples of intermediate data transfer apparatuses 113 are shown as possible implementations in a fleet yard 200, the intermediate data transfer apparatus 113 be implemented and relied upon for other types of freight haulers and configurations for monitoring tire sensors 123.

As shown in FIG. 2, the intermediate data transfer apparatus 113a is placed at a fixed position relative to a parking area 203. In various examples, the intermediate data transfer apparatus 113a can be positioned at one or more parking positions 209 in the fleet yard 200. For example, the intermediate data transfer apparatus 113a can be positioned such that when the vehicle is parked, the tires 119 and tire sensors 123 of the trailer 102 are within a communication range of the intermediate data transfer apparatus 113a. In some examples, the intermediate data transfer apparatus 113a can communicate over a network 116 with the tire sensors 123 of tires 119 associated with at least one trailer 102 or freight hauler in the parking area 203 to retrieve sensor information. The intermediate data transfer apparatus 113a can generate sensor data records comprising the retrieved sensor information (e.g., pressure, temperature, etc.) and communicate the sensor data records 136 of the at least one trailer 102 or freight hauler to the computing environment 103. In some examples, a plurality of intermediate data transfer apparatuses 113a can be provided for defined parking positions 209 within an arrangement of parking positions 209.

In some examples, when one or more tire sensors 123 are inactive or in a sleep mode, the intermediate data transfer apparatus 113a can interrogate the plurality of tire sensors 123. For example, the intermediate data transfer apparatus 113 can send a signal to activate the tire sensors 123 to enable the broadcast of the tire sensor data 143. Similarly, the intermediate data transfer apparatus 113 can send a signal disable the broadcast, returning the tire sensors 123 to a sleep mode.

In some examples, an intermediate data transfer apparatus 113 can identify a trailer 102 corresponding to the received sensor data of a set of tire sensors 123 of the plurality of tire sensors 123 based on the association to a specific freight hauler in the fleet data records 133. In other cases, an RFID tag 125 may be mounted or otherwise attached to a given trailer 102 (or other freight hauler). As such, the intermediate data transfer apparatus 113 can identify the corresponding freight hauler based at least in part by scanning the RFID tag 125. In other examples, a trailer 102 can be identified based at least in part on a location of the trailer 102, such as a defined parking position 209.

In contrast from the intermediate data transfer apparatus 113a, the intermediate data transfer apparatus 113b of FIG. 2 is mounted on or otherwise attached to a moving platform 213 (e.g., a platform on wheels, track, etc.) which can be adapted to move about an arrangement of trailers 102 in the parking positions 209. For example, as the moving platform 213 moves about the trailers 102 (or other freight haulers) in an arrangement of parking positions 209, the intermediate data transfer apparatus 113b mounted on or otherwise attached to a moving platform 213 obtain sensor information from the trailers 102 or other freight haulers. In various examples, the intermediate data transfer apparatus 113b can at least retrieve and store the tire sensor data 143 of freight haulers and/or trailers 102 prior to communicating the sensor data records 136 of the trailers 102 and/or other freight haulers to the computing environment 103.

In some examples, the moving platform 213 can be a vehicle driven by a user, such as a truck, car, motorcycle, and the like. The vehicle can be used to travel around the arrangement of trailers 102 to allow the attached intermediate data transfer apparatus 113b to communicate with tire sensors 123 attached to tires 119 of one or more trailers 102 and/or other freight haulers. In another example, the moving platform 213 can be a robotic device configured to travel a path relative to the arrangement of parking positions 209 to obtain the sensor information from the tire sensors 123. In some examples, the moving platform 213 or the robotic device can be coupled to a track, where a predetermined route is based at least in part on a configuration of the track. For example, the track can be positioned such that the moving platform 213 can travel about the perimeter of the fleet yard 200. The track can also be embedded in the parking area 203, such that a robotic device can be coupled or follow the predetermined route of at least a portion of the track.

As shown in FIG. 2, the intermediate data transfer apparatus 113b mounted on a moving platform 213 can be a robotic device configured to travel a path under at least one freight hauler or trailer 102. The path of travel can be directed by a user or can be a predetermined path. In some examples, the robotic device can include at least one sensor configured to detect an obstacle in the path of travel. In response to the obstacle detected in the path of travel, the intermediate data transfer apparatus 113b on mounted a moving platform 213 can be instructed to alter the predetermined route to advance the robotic device to travel around the obstacle.

In another example implementation, the intermediate data transfer apparatus 113c is positioned adjacent to a path of travel of a freight hauler or trailer 102. For example, in FIG. 2, the intermediate data transfer apparatus 113c is positioned near the entrance 206 of the fleet yard 200 to communicate with the sensors 123 of tires 119 of the freight hauler, such as a semitruck 101 and/or trailer 102, as it enters or departs the fleet yard 200.

According to various embodiments, the intermediate data transfer apparatus 113 can communicate with the tire sensors 123 of tires 119 associated with at least one freight hauler in the path of travel and within a predefined distance of the intermediate data transfer apparatus 113 to retrieve sensor information. The intermediate data transfer apparatus 113 can generate sensor data records comprising the retrieved sensor information and communicate the sensor data records of the at least one freight hauler to a server of the computing environment 103. In some examples, the intermediate data transfer apparatus 113 can interrogate the sensors by sending a signal to activate the tire sensors 123 to enable the broadcast of the tire sensor data 143. Similarly, the intermediate data transfer apparatus 113 can send a signal disable the broadcast, returning the tire sensors 123 to a sleep mode.

In some examples, at least one signal device 216 (e.g., 216a, 216b) can be configured to enable or disable the tire sensors 123 to broadcast sensor information. In an example, intermediate data transfer apparatus 113 can be adapted to include the signal device 216. In other examples, the signal device can be separate from the intermediate data transfer apparatus 113. As shown in FIG. 2, an example configuration can include a first signal device 216a and a second signal device 216b separated by a distance, where the intermediate data transfer apparatus 113c is positioned between the first and second signal devices. For example, the first signal device 216a can be configured to enable the tire sensors 123 to broadcast sensor information and the second signal device 216b can be configured to disable the tire sensors 123 cease broadcast sensor information, or vice versa, or both signal devices and both enable and disable broadcast of the sensor information. Although different implementations of the apparatus 113 are shown in FIG. 2, one or more of the different implementations can be used at any given time and the signal data collected can be from one or more of the different implementations.

Figure 3:
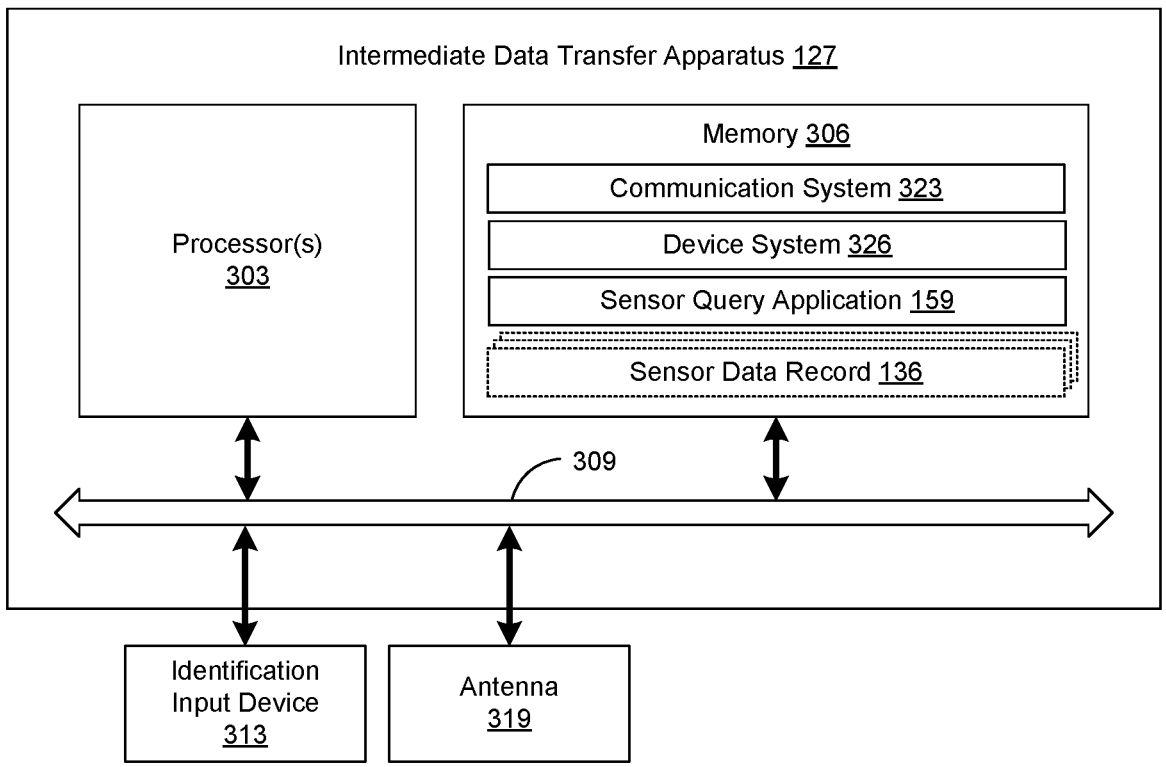
FIG. 3 is a schematic block diagram that provides one example illustration of an intermediate data transfer apparatus employed in the networked environment of FIG. 1 according to various embodiments of the present disclosure.

Turning now to FIG. 3, shown is a schematic block diagram of the intermediate data transfer apparatus 113 according to an embodiment of the present disclosure. The intermediate data transfer apparatus 113 includes at least one processor circuit, for example, having a processor 303 and a memory 306, both of which are coupled to a local interface 309. The local interface 309 may comprise, for example, a data bus with an accompanying address/control bus or other bus structure as can be appreciated. In some examples, an identification input device 313 such as an RFID scanner, camera, or other input device, can be coupled to the local interface 309. The local interface 309 can also be coupled to an antenna 319 for wireless communications.

The antenna 319 can interface with the communication system 323 to wirelessly receive tire sensor data 143 from one or more sensors 123 and/or vehicle computing devices 109. The antenna 319 can be configured to receive and store electronic data related to the corresponding tires 119 within a communication range. In some examples, the antenna 319 can be configured to extend the communication range to reach the sensors 123 from a greater distance. The antenna can also be configured wirelessly transmit tire sensor records 136 to a remote processor for analysis, such as a processor associated with the computing environment 103 and/or a cloud computing device.

Stored in the memory 306 are both data and several components that are executable by the processor 303. In particular, stored in the memory 306 and executable by the processor 303 are the sensor query application 159, a communication system 323, a device system 326, and potentially other applications. Also stored in the memory 306 may be sensor data records 136 and other data. In addition, an operating system may be stored in the memory 306 and executable by the processor 303.

A number of software components are stored in the memory 306 and are executable by the processor 303. In this respect, the term "executable" means a program file that is in a form that can ultimately be run by the processor 303. Examples of executable programs may be, for example, a compiled program that can be translated into machine code in a format that can be loaded into a random access portion of the memory 306 and run by the processor 303, source code that may be expressed in proper format such as object code that is capable of being loaded into a random access portion of the memory 306 and executed by the processor 303, or source code that may be interpreted by another executable program to generate instructions in a random access portion of the memory 306 to be executed by the processor 303, etc. An executable program may be stored in any portion or component of the memory 306 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

In some examples, an intermediate data transfer apparatus 113 can identify a trailer 102 or freight hauler corresponding to the received information sensor information of a set of tire sensors 123 of the plurality of tire sensors 123. For example, an RFID tag 125 may be mounted or otherwise attached to a given trailer 102. As such, the intermediate data transfer apparatus 113 can identify the corresponding trailer based at least in part on the RFID tag 125. In other examples, a trailer 102 can be identified based at least in part on a location of the trailer 102, such as a defined parking position 209.

Figure 4:
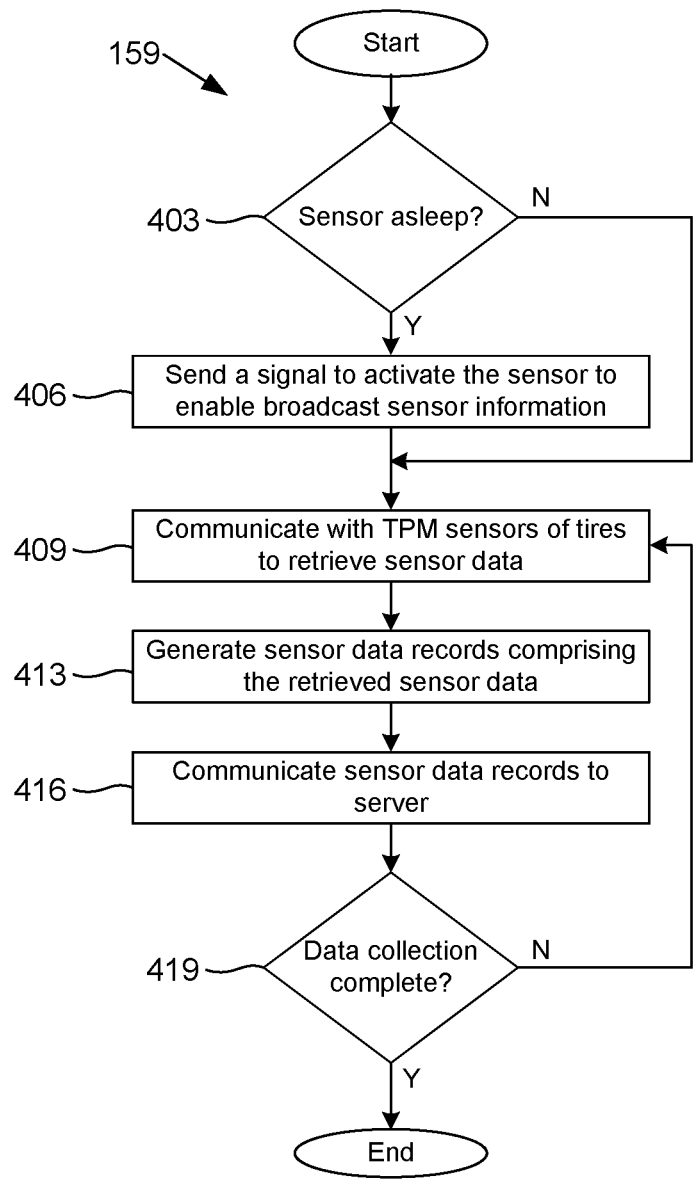
FIG. 4 is a flowchart illustrating one example of functionality implemented as portions of a sensor query application executed in an intermediate data transfer apparatus of the networked environment of FIG. 1 according to various embodiments of the present disclosure.

Referring next to FIG. 4, shown is a flowchart that provides one example of the operation of a portion of the sensor query application 159 according to various embodiments. It is understood that the flowchart of FIG. 4 provides merely an example of the many different types of functional arrangements that may be employed to implement the operation of the portion of the sensor query application 159 as described herein.

In particular, FIG. 4 provides an overview of the operation of the sensor query application 159 with respect to collecting tire sensor data 143, such as pressure and temperature measurements of a plurality of tire sensors 123.

Beginning with box 403, the sensor query application 159 can interrogate one or more sensors 123 to determine if one or more sensors 123 are asleep. When a freight hauler is not in use, one or more tire sensors 123 can be inactive or a sleep mode. The sensors 123 can also be placed in a sleep mode for other reasons. For example, the sensors 123 can be programmed to send sensor data on a predetermined time interval, but will not send data when in a sleep mode. If the sensor query application 159 determines that the one or more sensors are asleep, the sensor query application proceeds to box 409. Otherwise, the sensor query application 159 proceeds to box 406.

At box 406, the sensor query application 159 can cause the intermediate data transfer apparatus 113 to send a signal to enable the broadcast of the tire sensor data 143 and/or other relevant information. The signal can be a low frequency signal that can activate the tire sensor 123 during sleep mode to transmit sensor information, such as the temperature and pressure data.

At box 409, the sensor query application 159 communicates with the tire sensors 123 of tires 119 associated with at least one freight hauler to retrieve sensor information, such as tire sensor data 143 and/or tire identification data 139. According to various embodiments, the intermediate data transfer apparatus 113 can be in a fixed or moving position. In some examples, the tire sensors 123 are signaled to activate and broadcast the tire sensor data 143. In some examples, the tire sensor data 143 can alternatively or additionally be retrieved from the data store 156 of a vehicle computing device 109.

At box 413, the sensor query application 159 generates sensor data records 136 comprising the retrieved tire sensor data 143, including information such as tire pressures, temperature, etc. In some examples, the sensor data records 136 can include additional information, such as tire identification data 139 identifying at least one freight hauler associated with the tire sensors 123.

At box 416, the sensor query application 159 communicates the sensor data records 136 of the at least one freight hauler over the network 116 to the fleet management system 129 in the computing environment 103. In some examples, the sensor query application 159 retrieves and stores the tire sensor data 143 of the tires 119 of the freight haulers prior to communicating the sensor data records 136 to the server.

At box 419, the sensor query application 159 determines if the data collection is complete. For example, an intermediate data transfer apparatus 113 mounted on a moving platform 213 may stop at a predetermined position along a path to obtain tire sensor data 143 before moving to a next position. If the sensor query application 159 determines that the data collection is incomplete, the sensor query application 159 returns to box 409. Otherwise, this portion of the process proceeds to completion. In some cases, the intermediate data transfer apparatus 113 can also send a signal disable the broadcast of the tire sensor data 143, returning the tire sensors 123 to a sleep mode.

Figure 5:
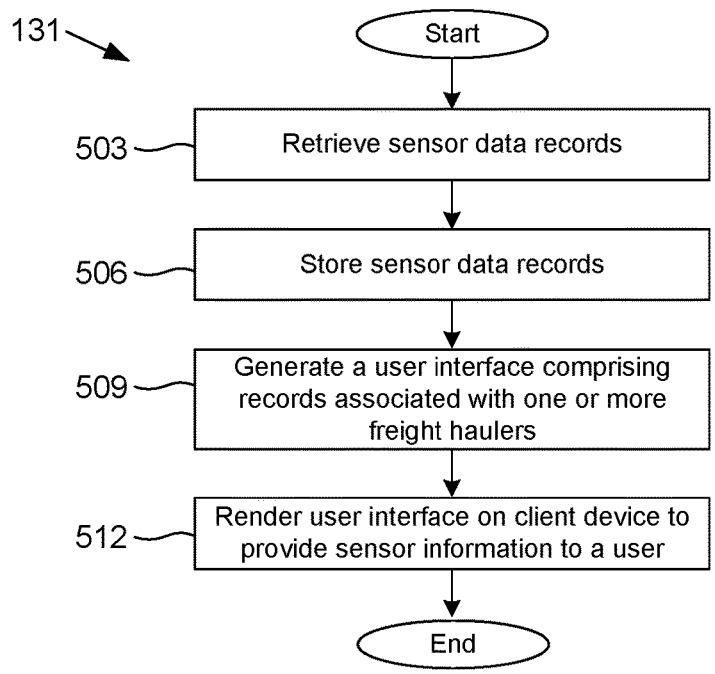
FIG. 5 is a flowchart illustrating one example of functionality implemented as portions of tire monitoring application executed in a computing environment of the networked environment of FIG. 1 according to various embodiments of the present disclosure.

Referring next to FIG. 5, shown is a flowchart that provides one example of the operation of a portion of the tire sensor monitoring application 131 according to various embodiments. It is understood that the flowchart of FIG. 5 provides merely an example of the many different types of functional arrangements that may be employed to implement the operation of the portion of the tire sensor monitoring application 131 as described herein.

In particular, FIG. 5 provides an overview of the operation of the tire sensor monitoring application 131 with respect to computing environment 103 including an intermediate data transfer apparatus 113. The tire sensor monitoring application 131 can interface with, or be embodied as a portion of, the fleet management system 129 to provide more detailed information about a semitruck 101 and/or trailer 102 in a fleet of freight haulers.

Beginning with box 503, the tire sensor monitoring application 131 communicates with one or more intermediate data transfer apparatuses 113 to retrieve tire sensor data records 136 of one or more freight haulers in a fleet. The tire sensor data records 136 can include tire identification data 139, tire sensor data 143, and other relevant information regarding the tires 119 of the freight hauler. The tire sensor data records 136 can represent a plurality of tires 119 corresponding to one or more freight haulers.

At box 506, the tire sensor monitoring application 131 stores the retrieved tire sensor data records 136 in a data store 126. The data store 126 can comprise a database associated with a plurality of freight haulers where the tire identification data 139 of the tire sensor data records 136 can be associated with other representative data for one or more freight haulers.

At box 509, the tire sensor monitoring application 131 generates a user interface comprising the tire sensor data records 136 associated with one or more freight haulers. In one example, the user interface can allow the user to input or select the fleet yard 200 being monitored. In another example, the user interface can provide access to information regarding the tire sensors 123 of a particular freight hauler.

At box 512, the tire sensor monitoring application 131 renders a user interface 149 on a client device 106 to provide information or notifications to the user. For example, a graphical depiction of a fleet yard 200 can be displayed on the user interface 149 to provide an indication of the location of the freight hauler within the fleet yard, status of the set of tires 119 associated with the freight hauler, and other relevant information. Notifications regarding a change in tire status can also be rendered in the user interface, or sent to the user via email, text, etc. Thereafter, this process proceeds to completion.

Figure 6:
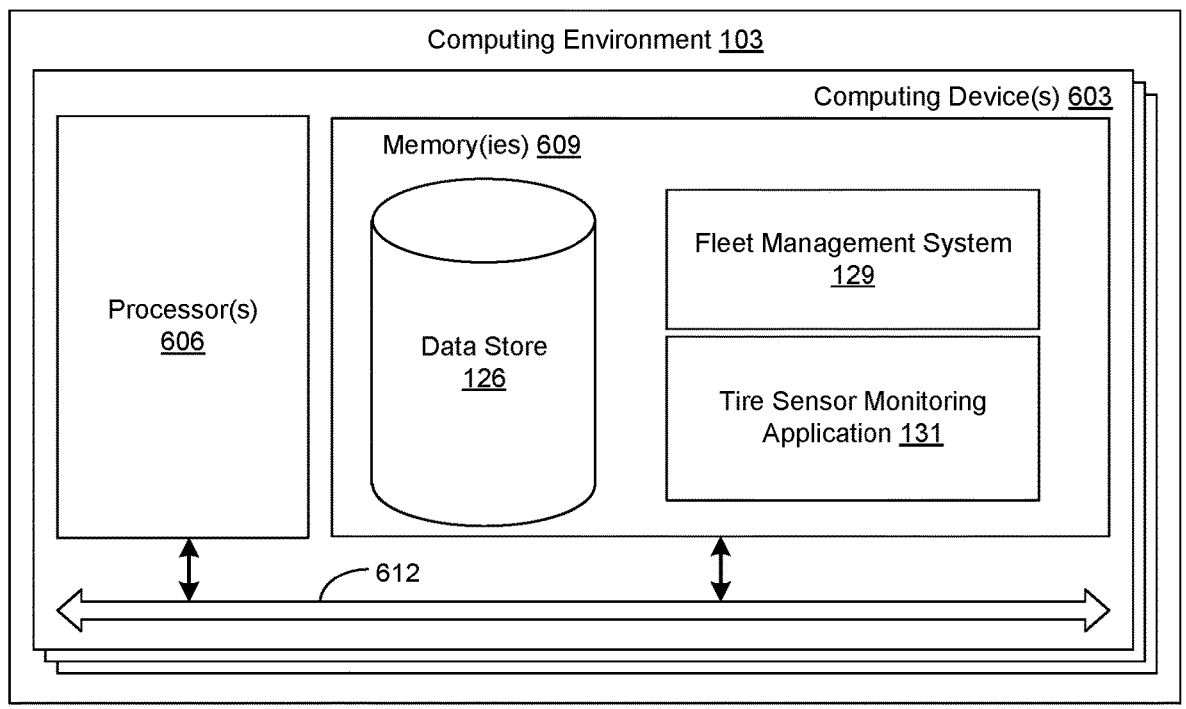
FIG. 6 is a schematic block diagram that provides one example illustration of the computing environment employed in the networked environment of FIG. 1 according to various embodiments of the present disclosure.

With reference to FIG. 6, shown is a schematic block diagram of the computing environment 103 according to an embodiment of the present disclosure. The computing environment 103 includes one or more computing devices 603. Each computing device 603 includes at least one processor circuit, for example, having a processor 606 and a memory 609, both of which are coupled to a local interface 612. To this end, each computing device 603 may comprise, for example, at least one server computer or like device. The local interface 612 may comprise, for example, a data bus with an accompanying address/control bus or other bus structure as can be appreciated.

Stored in the memory 609 are both data and several components that are executable by the processor 606. In particular, stored in the memory 609 and executable by the processor 606 is a fleet management system 129, and potentially other applications. Also stored in the memory 609 may be a data store 126 and other data. In addition, an operating system may be stored in the memory 609 and executable by the processor 606.

It is understood that there may be other applications that are stored in the memory 609 and are executable by the processor 606 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 609 and are executable by the processor 606. In this respect, the term "executable" means a program file that is in a form that can ultimately be run by the processor 606. Examples of executable programs may be, for example, a compiled program that can be translated into machine code in a format that can be loaded into a random access portion of the memory 609 and run by the processor 606, source code that may be expressed in proper format such as object code that is capable of being loaded into a random access portion of the memory 609 and executed by the processor 606, or source code that may be interpreted by another executable program to generate instructions in a random access portion of the memory 609 to be executed by the processor 606, etc. An executable program may be stored in any portion or component of the memory 609 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 609 is defined herein as including both volatile and nonvolatile memory and data storage components. Volatile components are those that do not retain data values upon loss of power. Nonvolatile components are those that retain data upon a loss of power. Thus, the memory 609 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 606 may represent multiple processors 606 and/or multiple processor cores and the memory 609 may represent multiple memories 609 that operate in parallel processing circuits, respectively. In such a case, the local interface 612 may be an appropriate network that facilitates communication between any two of the multiple processors 606, between any processor 606 and any of the memories 609, or between any two of the memories 609, etc. The local interface 612 may comprise additional systems designed to coordinate this communication, including, for example, performing load balancing. The processor 606 may be of electrical or of some other available construction.

Although the fleet management system 129, tire sensor monitoring application 131, sensor query application 159, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4 and 5 the functionality and operation of an implementation of portions of the sensor query application 159. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 606 in a computer system or other system. The machine code may be converted from the source code, etc. If embodied in hardware, each block may represent a circuit or a number of interconnected circuits to implement the specified logical function(s).

Although the flowcharts of FIGS. 4 and 5 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the sensor query application 159, fleet management system 129, or tire sensor monitoring application 131, that comprises software or code can be embodied in any non-transitory computer-readable medium for use by or in connection with an instruction execution system such as, for example, a processor 303 or 606 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including sensor query application 159, fleet management system 129, or tire sensor monitoring application 131, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 603, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
an apparatus placed at a fixed position relative to a parking area, the apparatus comprising at least one processor circuit with a memory comprising a plurality of instructions, wherein when executed by at least one processor circuit, the instructions cause the at least one processor circuit to at least:
communicate with individual ones of a plurality of tire pressure monitoring (TPM) sensors of tires associated with at least one freight hauler in the parking area to retrieve sensor information;
generate sensor data records comprising the retrieved sensor information; and
communicate the sensor data records of the at least one freight hauler to a remote computing device; and
a first signal device configured to enable the TPM sensors to broadcast the sensor information; and
a second signal device configured to disable individual ones of the TPM sensors to cease broadcast of the sensor information.

2. The system of claim 1, wherein the parking area comprises a parking position in an arrangement of parking positions adapted to accommodate a plurality of freight haulers.

3. The system of claim 1, wherein to communicate with the individual TPM sensors, the at least one processor circuit is further configured to interrogate the plurality of TPM sensors.

4. The system of claim 1, wherein the instructions further cause the at least one processor circuit to identify an individual freight hauler corresponding to the sensor information of a set of TPM sensors of the plurality of TPM sensors.

5. The system of claim 4, wherein identifying the individual freight hauler comprises detecting a radio-frequency identification (RFID) tag on the individual freight hauler to be identified.

6. The system of claim 4, wherein identifying the individual freight hauler comprises identifying a location of the individual freight hauler, the individual freight hauler being identified based at least in part on a mapping of the location with the individual freight hauler.

7. A system, comprising:
an apparatus mounted on a moving platform adapted to move about an arrangement of parking positions adapted to accommodate a plurality of freight haulers, the apparatus comprising at least one processor circuit with a memory comprising a plurality of instructions, wherein when executed by the at least one processor circuit, the instructions cause the at least one processor circuit to at least:
communicate with individual ones of a plurality of tire pressure monitoring (TPM) sensors of tires associated with at least one freight hauler to retrieve sensor information;
generate sensor data records comprising the retrieved sensor information; and
communicate the sensor data records of the at least one freight hauler to a remote computing device; and
a first signal device configured to enable the TPM sensors to broadcast the sensor information; and
a second signal device configured to disable individual ones of the TPM sensors to cease broadcast of the sensor information.

8. The system of claim 7, wherein the instructions further cause the at least one processor circuit to at least retrieve and store the sensor information of a plurality of freight haulers prior to communicating the sensor data records of the plurality of freight haulers to the remote computing device.

9. The system of claim 7, wherein the moving platform comprises a vehicle.

10. The system of claim 7, wherein the moving platform comprises a robotic device configured to travel a path relative to the arrangement of parking positions.

11. The system of claim 10, wherein the path of the robotic device is directed by a user.

12. The system of claim 10, wherein traveling the path comprises the robotic device traveling under at least one freight hauler.

13. The system of claim 10, wherein the apparatus is in electronic communication with the robotic device and instructs the robotic device to move along a predetermined route within the arrangement of parking positions.

14. The system of claim 13, wherein the robotic device comprises at least one sensor configured to detect an obstacle in the path of travel, and in response to the obstacle detected in the path of travel, the apparatus:
receives data identifying the obstacle in the path of travel from the at least one sensor,
determines an alteration in the route based on the at least one obstacle,
and instructs the robotic device to alter the predetermined route to travel around the obstacle.

15. The system of claim 13, wherein the robotic device is coupled to a track, and the predetermined route is based at least in part on a configuration of the track.

16. A system, comprising:
an apparatus positioned adjacent to a path of travel, the apparatus comprising at least one processor circuit with a memory comprising a plurality of instructions, wherein when executed by the at least one processor circuit, the instructions cause the at least one processor circuit to at least:
communicate with individual ones of a plurality of tire pressure monitoring (TPM) sensors of tires associated with at least one freight hauler in the path of travel and within a predefined distance of the apparatus to retrieve sensor information;
generate sensor data records comprising the retrieved sensor information; and
communicate the sensor data records of the at least one freight hauler to a remote computing device; and
a first signal device configured to enable the TPM sensors to broadcast the sensor information; and
a second signal device configured to disable individual ones of the TPM sensors to cease broadcast of the sensor information.

17. The system of claim 16, wherein to communicate with individual TPM sensors, the at least one processor circuit is further configured to interrogate the plurality of TPM sensors.

18. The system of claim 16, wherein the apparatus is positioned between the first and second signal devices.

19. The system of claim 16, wherein the sensor information of the at least one freight hauler is retrieved while the at least one freight hauler is moving within the predefined distance from the apparatus.

* * * * *